United States Patent [19]
Fiddler

[11] 3,820,828
[45] June 28, 1974

[54] COMPACT MULTIPLE CONNECTOR APPARATUS FOR MULTIPLE CHANNELS AND TUBES

[76] Inventor: Theodore E. Fiddler, 1268 Suffield Dr., Birmingham, Mich. 48009

[22] Filed: Jan. 26, 1973

[21] Appl. No.: 326,839

[52] U.S. Cl.............. 285/137 R, 137/271, 137/609, 137/625.46, 137/625.48
[51] Int. Cl............................................. F16l 39/00
[58] Field of Search..... 285/137 R, 137 A; 137/271, 137/625.46, 625.48, 609

[56] References Cited
UNITED STATES PATENTS

| | | | |
|---|---|---|---|
| 2,911,200 | 11/1959 | Gardner | 285/137 R |
| 3,471,178 | 10/1969 | Roe | 285/137 R |
| 3,580,615 | 5/1971 | Prosser | 285/137 R |
| 3,677,577 | 7/1972 | Krauer et al. | 285/137 R |
| 3,752,167 | 8/1973 | Makabe | 137/609 |

Primary Examiner—H. Hampton Hunter
Attorney, Agent, or Firm—William T. Sevald

[57] ABSTRACT

A compact apparatus for sealably interconnecting multiple aligned channels between the mating surfaces of two bodies wherein at least one body is relatively elastic and wherein multiple tubes lead to the channels of the elastic body with the I.D. size of the channels substantially the same as the I.D. size of the tubes thereby eliminating nipples which require tube I.D. size to be much larger than channel I.D. size. This allows the tubes and channels to be closely spaced and allows body size to be substantially reduced and in fact miniaturized. This also allows the use of small O.D. thin wall tubes without danger of rupture as when expanded over nipples. The tubes are bonded in the elastic body or sealed in counterbores of the elastic body by the radial movement of the elastic body against the tubes under the force exerted by a clamp plate to seal the tubes and channels in end-to-end communication. The mating surfaces of the bodies are sealed against one another under the force exerted by the clamp plate with the elastic body mating surface conforming to the surface of the other body to seal the tubes and/or their aligned channels in end-to-end communication. Tongue and groove interfitting, extending annular lips, mouths, heads and sockets, singly and in combination, at the mating surfaces of the bodies augment the seal at the mating surfaces of the bodies to seal the channels of the bodies in end-to-end communication.

10 Claims, 7 Drawing Figures

COMPACT MULTIPLE CONNECTOR APPARATUS FOR MULTIPLE CHANNELS AND TUBES

BACKGROUND OF THE INVENTION

Fluid pressure force (FPF) systems, such as in the automotive field to control air conditioning units and heaters in conjunction with one another, employ multiple tubes to conduct the FPF and combination controller devices to selectively apply the FPF to various components. Ten to twenty tubes may be used and heretofore they have been connected to the controller devices by inserting nipples on the controllers into the holes in the ends of the tubes. The aperture in the nipple is the size channel required to conduct sufficient FPF in the system. The outer diameter of the nipple is much larger than the internal diameter of the nipple channel. The tube or hose must be of a size to have a hole large enough to receive the O.D. of the nipple. The tube or hose then must have a larger outside diameter to give the tube or hose sufficient wall thickness to provide sufficient strength to sealably engage the nipple. Also there must be relatively wide spacing between the tubes to insure that the tubes are sealed off relative to one another. Thus the number of hoses or tubes and their relatively large outside diameters, the spaces needed to force them on the nipples, and the space between tubes requires a large area compared to the size of the channel itself. Thus the size of the controller body is large, the space between the channels is large, and the hoses or tubes are large. Attempts have been made to reduce the O.D. of the nipples but this leaves the nipples too structurally weak to support the hoses or tubes and the nipples break off. Also the size of the nipple apertures have been reduced and this reduces channel size and makes molding the nipple apertures even more difficult as spring-wires are required in the molds or dies and they flex about creating inaccuracies and scrap parts and the wires break off allowing nipples to be molded without apertures. Thus the prior art has a long-felt want for tube and channel connectors and sealing means which provide small bodies having close spaced channels sealably connected to tubes of small outside diameter wherein the tubes are not subjected to rupturing forces.

The prior art devices thus are complicated in design and structure; expensive to manufacture; difficult to install, replace, and repair; and are undesirably large in hose or tube size and in part size.

In an effort to reduce part size, the latest prior art devices which connect large numbers of tubes, such as 10 to 20, employ stepped, radially staggered, and axially banked connectors expanding side-wise outwardly from the adjacent surface of the part. These connectors pyramid the tubes toward the surface from a widespread arrangement remote from the surface. These connectors are confusing, cumbersome, expensive, and time-consuming to manufacture, install, and repair and objectionably faulty in use. Also they do not adequately reduce part size.

SUMMARY OF THE PRESENT INVENTION

With the foregoing in view, it is a primary object of the invention to provide multiple channel connector apparatus for multiple tubes and channels which is simple in design and structure; inexpensive to manufacture; easy to install, repair, and replace; and which is desirably small in tube size, connector size, and part size.

A principal object of the invention is to eliminate the use of nipples which, if large enough to have sufficient strength, require hoses objectionably large which, in turn, require larger part size and wider spacing of the channels.

A primary object of the invention is to provide multiple channel connector apparatus having close spaced channels, small diameter tubes leading to the channels, means to seal the tubes to the apparatus, and means to seal the apparatus to a mating part such as a like apparatus, a controller, etc.

A further object of the invention is to provide small channel size and close channel spacing allowed by the small tube size and the sealing means.

A further object is to provide sealing means between the connector apparatus and another part which effects the seal by bonding the parts together and/or by the force exerted substantially axially of the tubes and channels thus eliminating the need for radial area required by radial seals such as nipples, O-rings, additional material between the tubes, and the like.

A further object of the invention is to provide sealing means formed integrally with the bodies constituting the apparatus wherein at least one body is made of elastic material so as to be deformable under force to effect a seal.

A further object of the invention is to sealably connect thin wall tubes at the channels to save space.

These and other objects of the invention will become apparent by reference to the following detailed description of the illustrated exemplary embodiment of the invention taken in connection with the accompanying drawings.

DETAILED DESCRIPTION OF THE ILLUSTRATED EMBODIMENT

Figure 1:
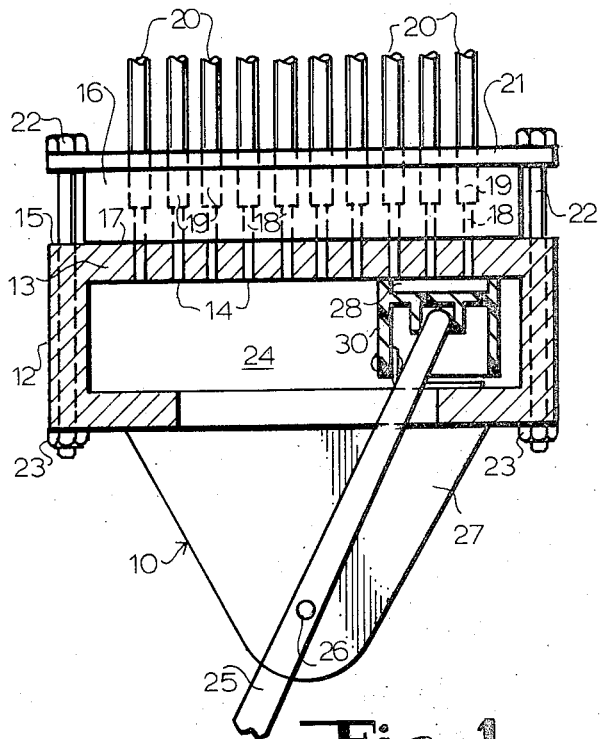
FIG. 1 is a plan view of a linear motion controller device showing the tubes, clamp plate, and elastic body in elevation with broken lines indicating the inserted portion of the tubes and the adjacent channels; showing in cross-section the channel switch chamber, circuit maze slide switch block, and the housing; showing the hand lever and support in elevation; and showing the tubes inserted in counterbores of the elastic part.

Referring now to the drawings wherein like reference numerals refer to like and corresponding parts throughout the several views, the exemplary devices disclosed therein to illlustrate the invention comprise a linear motion controller device 10 and an angular motion controller device 11. The device 10, FIGS. 1 and 3, has a body 12 having a wall 13 with a plurality of channels 14 formed therein. The wall 13 has a mating surface 15 through which the channels 14 extend. A body 16 has a mating surface 17 lying against the mating surface 15 of the body 12. The body 16 has a plurality of cylindrical bores 18 constituting channels aligned with the channels 14 of the body 12 in end-to-end communication. Counterbores 19 in the body 16 lie above each bore or channel 18. A tube 20 is inserted and press-fitted in each counterbore 19 in end-to-end communication with each bore or channel 18. A clamp plate 21 abuts the body 16. The plate 21 has apertures surrounding each tube 20 and a plurality of bolt holes for receiving the bolts 22 which extend through the body 12. Nuts 23 threaded on the bolts 22 compress the body 16 between the clamp plate 21 and the body 12 urging their mating surfaces 15 and 17 against one another under clamping force and also urge the clamp plate 21 against the body 16 with clamping force. A linear motion channel switch block 30 lies in the chamber 24 of the body 12 and is operated by a hand lever 25 pivoted at 26 on a support 27 extension of the body 12. The block 30 has a circuit maze 28 lying against the channels 14. By sliding the block 30 relative to the channels 14, various channels 14 are interconnected for communication and/or blocked from communication as desired and engineered in the construction and design of the device and the system to be controlled and as more particularly set forth in U.S. Pat. Nos. 3,637,961 and 3,637,962, issued to me.

Figure 2:
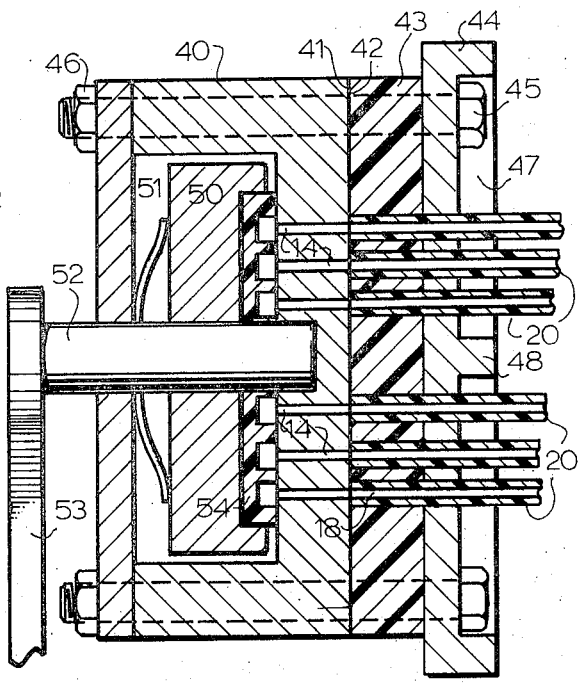
FIG. 2 is a diametrical cross-section view of an angularly moving controller device showing the shaft and hand lever in elevation; and showing the tubes extending through the elastic part into contact with the mating part.
Figure 3:
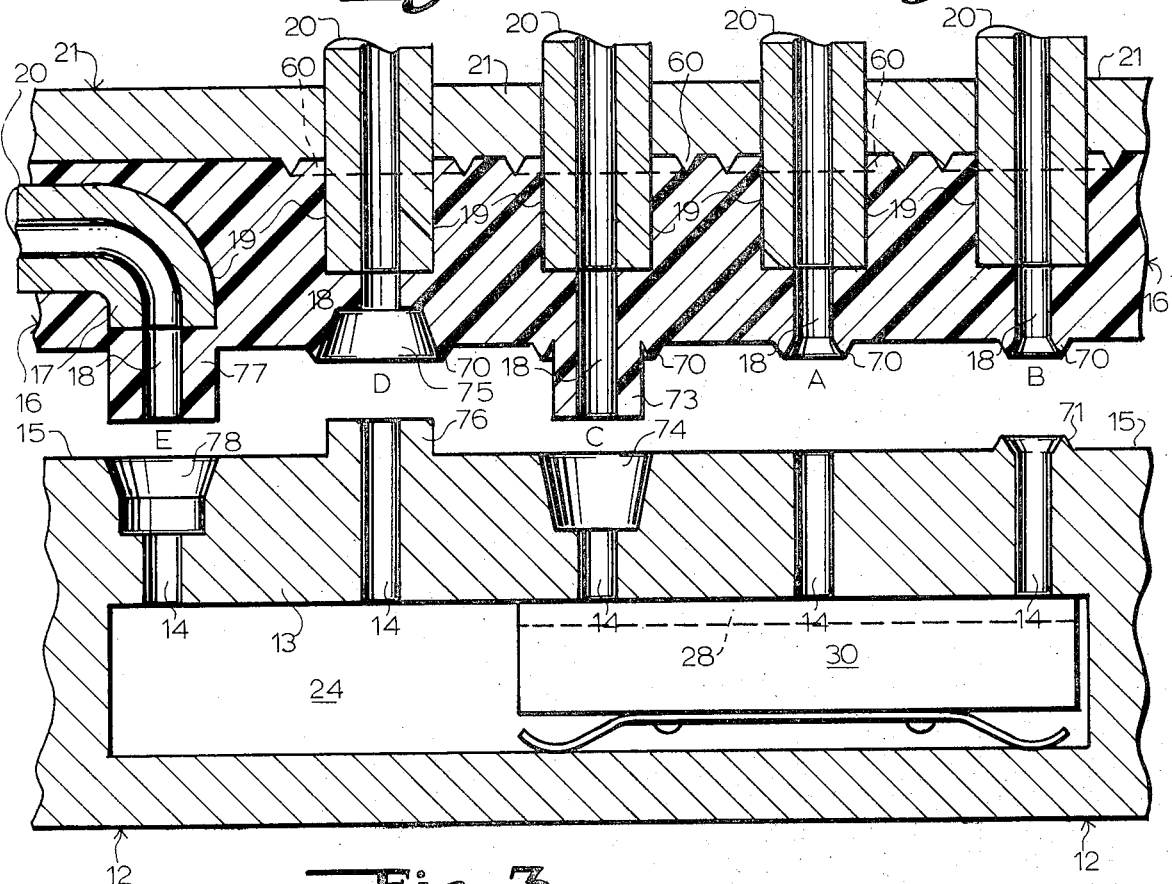
FIG. 3 is a greatly enlarged cross-sectional partial view of the embodiment of FIG. 1 showing the bodies separated at their mating surfaces; and showing a plurality of additional sealing configurations at the juncture of the mating surfaces and channels of the bodies, showing the bodies broken away at the outer ends of the view, and showing the channel sealing additional elements at the mating surfaces prior to sealing deformation under clamping force.
Figure 4:
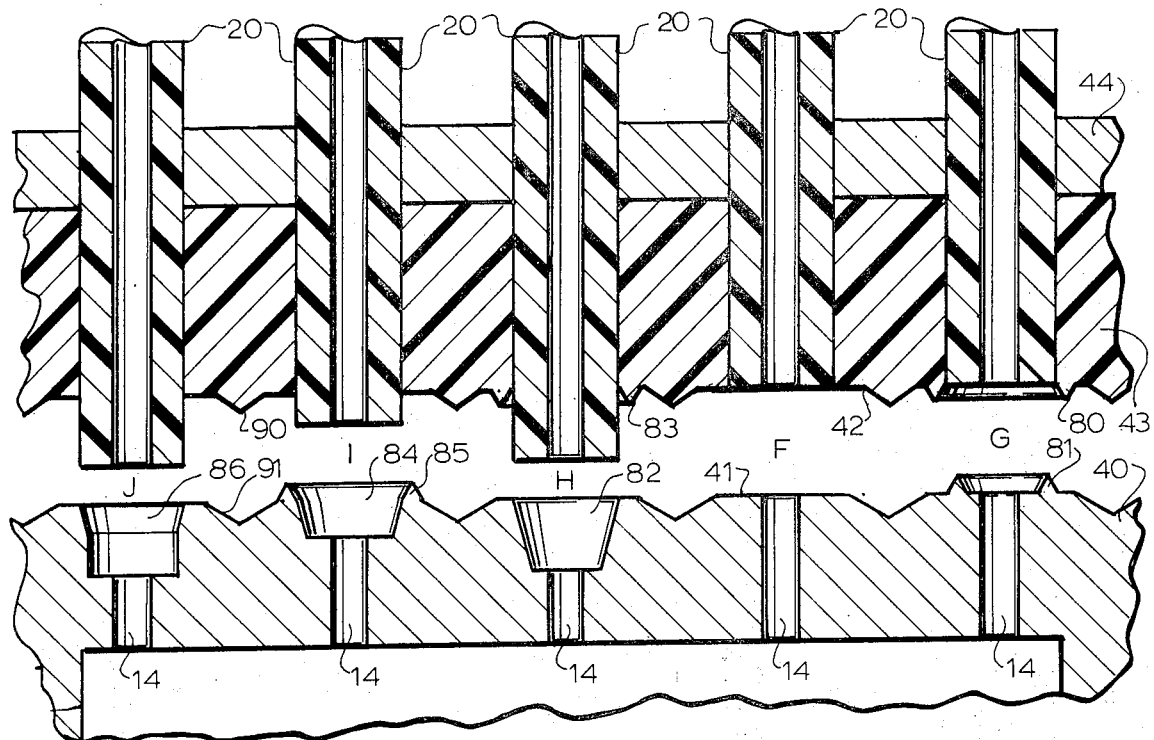
FIG. 4 is a greatly enlarged cross-sectional partial view of the embodiment of FIG. 2 with the clamp plate, tubes and elastic body bonded together with the tubes leading through the elastic body showing the bodies separated prior to being clamped together; showing various additional sealing configurations at the juncture of the ends of the tubes and the mating surface of the elastic body with the other body, and showing the tubes in elevation.
Figure 5:
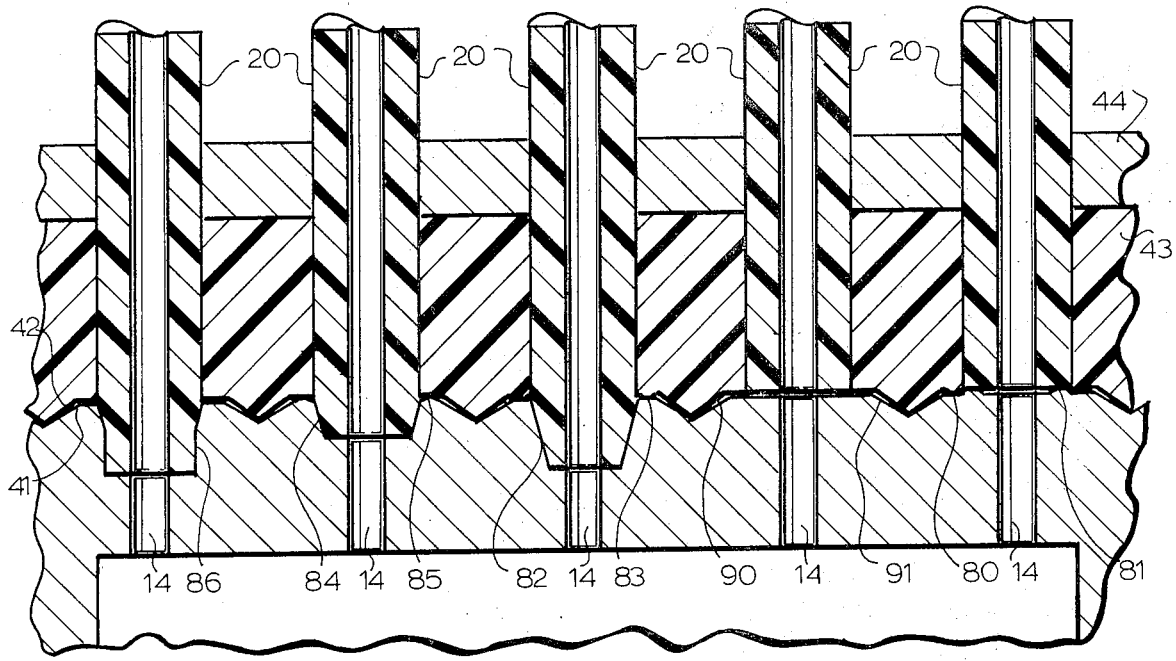
FIG. 5 is a view similar to FIG. 4 showing the bodies seen in FIG. 4 clamped together in sealing relationship showing the tubes in cross-section.

The rotary controller device 11 of FIGS. 2, 4 and 5 has a body 40 with a mating surface 41 compressed against the melting surface 42 of the body 43 under the clamping force of the clamp plate 44 exerted by the mechanical force developed by the bolts 45 and nuts 46. The clamp plate 44 has an upstanding flange 47 and cross-ribs 48 to insure equal clamping force against the body 43. The clamp plate 21 of FIGS. 1 and 3 also may have flanges and ribs. The tubes 20 lie in the apertures 19 in end-to-end communication with the channel 14 of the body 40 at the juncture of the mating surfaces 41 and 42. The clamp plate 44 and the tubes 20 are assembled in the injection molding die and the elastic body 43 injected molded in the die bonding the body 43, the clamp plate 44, and the tubes 40 into a unitary assembly. An annular switch block 50 lies in the switch chamber 51 of the body 40 and is angularly movable on the axle 52 which is rotated by the hand lever 53 to switch channels between the tubes 20 and the channels 14. The circuit maze 54 is fixed on the block 50 and rotates therewith relative to the channels 14.

Referring to FIG. 3 which illustrates the channel sealing means shown with the device of FIG. 1, it will be understood that these elements also may be used with the device of FIG. 2. Either or both bodies 12 and 16 may be made of relatively elastic material which is deformable under clamping force to effect sealing. In the showing of FIG. 3, it may be considered that the body 16 is more elastic and deformable than the body 12. The tubes 20 are inserted in the counterbores 19 with the hole in each tube 20 in end-to-end communication with the associated bore or channel 18 in the body 16. Due to the elasticity of the body 16, the counterbores 19 may be the same size or smaller than the outside diameter of the tubes 20 and receive the tubes 20 in press-fitted relationship by expanding the counterbores 19 in the resilient body 16 thereby producing an initial seal between the tube 20 and the counter bore 19. To augment the seal therebetween the clamping force of the clamp plate 21 compresses the body 16 causing the counterbores 19 to move against the tubes 20. To further augment the seal the clamp plate 21 has annular ridges 60 on its face abutting the body 16. The ridges 60 concentrically surround the tubes 20. The ridges 60 displace the elastic material of the body effecting flow against the tubes 20 in the area of the counterbores 19 to additionally effect sealing therebetween.

Referring now to the additional means for sealing the channels 14 and 18 of the bodies 12 and 16 respectively in end-to-end communication, type A comprises a plane face on the mating surface 15 and an extending annular lip 70 on the mating surface 17. When the surfaces 15 and 17 are clamped together under force, the annular lip 70 deforms against the plane face of the surface 15 and seals the channels 14 and 18 in end-to-end communication.

Type B includes the annular lip 70 on the mating surface 17 and additionally includes an extending annular mouth 71 on the mating surface 15. The mouth 71 is preferably slightly diametrically larger or smaller than the annular lip 70 so that the peripheral rim of the lip 70 jams against the peripheral rim of the mouth 71. Under clamping force the mouth 71 sealably deforms the lip 70 radially inwardly or outwardly in conjunction with axial sealing deformation of the lip 70 under clamping force.

Type C has the annular lip 70 surrounding the channel 18 and also has an annular head 73 extending the channel 18 outwardly of the surface 17. A tapering socket 74 in the body 12 lies below the surface 15. The head 73 is diametrically larger than the smallest diameter of the socket 74 so that the head 73 is jam-fitted in the socket 74 in sealing relationship in addition to the sealing relationship between the annular lip 70 and the surface member 15 under clamping force.

Type D has the annular lip 70 surrounding the channel 18 and a socket 75 within the lip 70 and below the surface 17 at the channel 18. A head 76 extends the channel 14 above the surface 15 of the body 12 and is adapted to jam-fit in the socket 75 of the body 16 in sealing relationship in addition to the annular lip 70 seal against the surface 15.

Type E has a head 77 extending the channel 18 beyond the surface 17 of the body 16 and the body 12 has a composit socket 78 below the surface 15. The socket 78 is composed of an outer tapered portion and an inner cylindrical portion. The tapered portion leads the head 77 to the cylindrical portion as the head 77 enters the socket 78 under clamping force to effect a seal between the channels 14 and 18.

Referring now to the embodiments shown in FIGS. 4 and 5, it will be noted that the tubes 20 extend through apertures in the clamp plate 44, through the elastic body 43, and lead through the mating surface 42 so as to communicate with the channels 14 of the body 40 in end-to-end relationship. In this regard the ends of the tubes 20 may lie flush with the mating surface 42 or extend beyond as shown. Type F shows the end of the tube 20 sealing against the plane face of the mating surface 41 of the less elastic body 40. Type G has an annular mouth 80 on the body 43 surrounding the end of the tube 20 sealably closing with an annular lip 81 on the body 40. In type H the tube 20 extends past the mating surface 42 and is surrounded by an annular lip 83 and the body 40 has a tapered socket 82. The socket 82 receives the extending end of the tube 20 in a press-fitted seal and lip 83 seals against the plane face of the mating surface 41 of the body 40. Type I has a tapered socket 84 surrounded by an annular mouth 85 on the body 40 and the tube 20 extends from the body 43. The extending end of the tube 20 seals in the socket 84 and the mouth 85 seals against the elastic body 43. In type J the body 40 has a compound cylindrical and tapered socket 86 and the tube extends from the body 43. The extending end of the tube 20 is sealably compressed in the socket 86.

Figure 6:
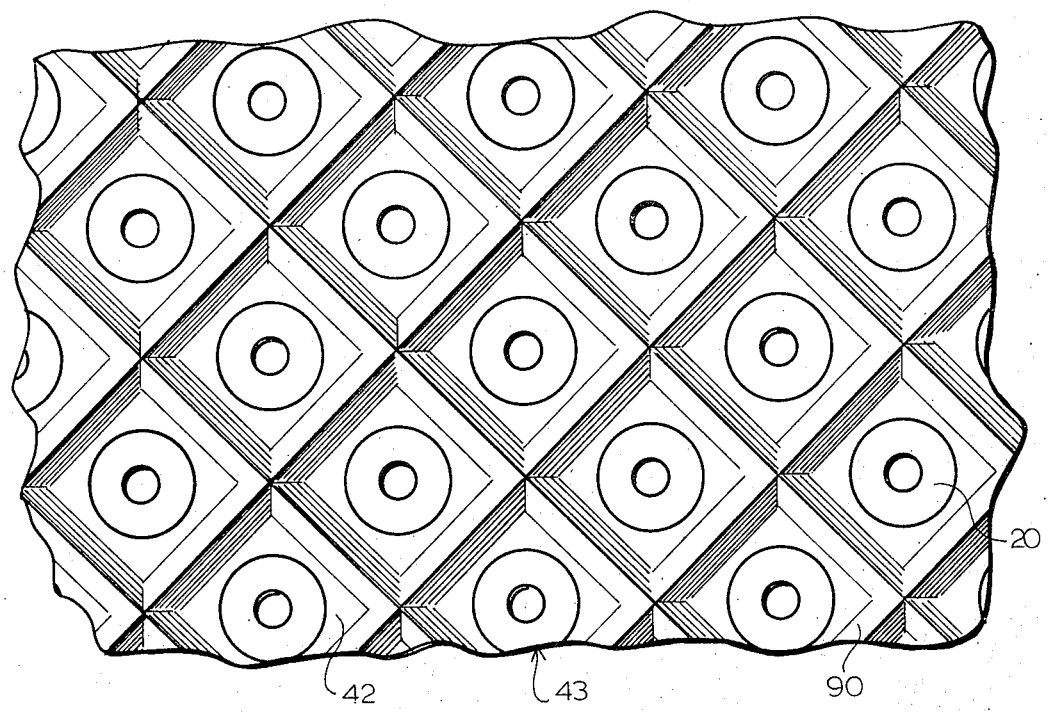
FIG. 6 is a greatly enlarged partial and broken away face elevational view of the mating surface of the elastic body showing the crossing tongues thereon in more detail and the tubes and channels sealed off therebetween.
Figure 7:
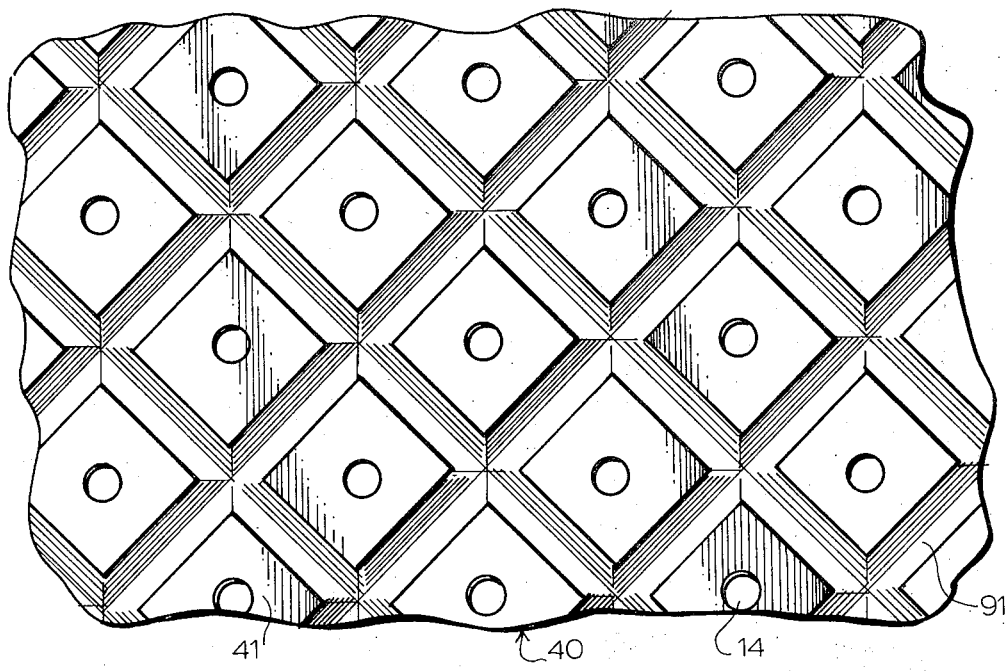
FIG. 7 is a greatly enlarged partial and broken away face elevational view of the mating surface of the other body showing the crossing grooves thereon in more detail and the channels sealed off therebetween.

Referring now to FIGS. 6 and 7 in conjunction with FIGS. 4 and 5, cross-connected tongues 90 in a wafflelike configuration extend from the mating surface 42 of the elastic body 43 and surround the exposed ends of the tubes 20. Cross-connected groove 91 lie in the mating surface 41 of the body 40 and surround the openings of the channels 14. The tongues 90 are adapted to sealably interfit in the grooves 91 to sealably surround the juncture of the ends of the tubes 20 with the channels 14 at the mating surfaces 41 and 42 of the bodies 40 and 43 respectively to isolate each tube 20 and its associated channel 14 in sealed end-to-end communication.

It will be understood that the linear motion controller of FIG. 1 and the angular motion controller FIG. 2 and their associated embodiments of the connector apparatus is for illustrative purposes and that the connector apparatus associates with either controller may be used with the other and that the connector apparatus embodiments may be used with devices other than controllers. It will be further understood that additional sealing means designated types A through J inclusive may be used singly and in combination with each other and also separately and/or with the interfitting tongues 90 and grooves 91 and that the tongues 90 and grooves 91 may be used without the sealing means of types A through J inclusive as desired and that they are shown in conjunction with one another and separately for illustrative purposes.

The device of the invention solves the problem of close connecting a large number of tubes in a small space in end-to-end sealed condition with channels to achieve small part size and close channel positioning and also solves the problem of sealing close spaced channels in end-to-end sealed condition. The connector apparatus of the invention achieves the desired small part size urgently needed in industry.

The scope of the protection of the invention is defined in the appended claims.

I claim:

1. A multiple channel and multiple tube connector apparatus having closely positioned tubes and channels to achieve small part size comprising,
    a relatively less elastic first body having a mating surface, a remote surface, and at least two close-spaced channels opening through said mating surface,
    a relative more elastic second body having a mating surface, a remote surface, and at least two bores opening through its said mating surface and aligned with said channels of said first body;
    tubes in said bores of said second body having holes constituting channels in said second body opening through its said mating surface;
    said mating surfaces of said first and second bodies abutting one another with said channels of said first body aligned in end-to-end communication with said tube channels of said second body;
    a clamp plate superposed on said remote surface of said second body; and
    means for exerting clamping force between said clamp and said first body to compress said second more elastic body between said plate and said first body with said mating surface of said second body sealed against said mating surface of said first body to seal said channels of said second body in end-to-end communication with said aligned channels of said first body.

2. In an apparatus as set forth in claim 1, said clamp plate, said tubes, and second body being bonded together prior to assembly on said first body.

3. In an apparatus as set forth in claim 1, said mating surface of one said body having a tongue surrounding at least one of its said channels and said mating surface of said other body having a groove for receiving said tongue; said tongue and said groove compressing together under said clamping force to make an enclosing seal around the end-to-end juncture of said enclosed and aligned channels of said bodies.

4. In an apparatus as set forth in claim 1, said bores of said second more elastic body being smaller than the outside diameter of said tubes; said second more elastic body having larger counterbores leading from said remote surface of said second more elastic body with said counterbores leading part-way through said second more elastic body;
    said counterbores being sized to receive said tubes;
    said tubes being fitted in said counterbores;
    said tubes thereby being in end-to-end communication with said bores and said bores being in end-to-end communication with said channels of said first less elastic body.

5. In an apparatus as set forth in claim 1, said tubes being frictionally fitted in said bores of said second more elastic body and said clamp plate under the clamping force exerted by said means compressing said second more elastic body causing it to move into forced sealing engagement with said tubes.

6. In an apparatus as set forth in claim 5, said tubes extending from said second more elastic body at its said remote surface axially of said bores and said channels.

said clamp plate having apertures receiving said tubes, and extending ridges on said clamp plate facing said remote surface of said second more elastic body; said ridges lying adjacent said tubes;

said ridges under clamping force exerted on said clamp plate by said means augmenting movement of said second more elastic body against said tubes to augment sealing said tubes relative to said second more elastic body.

7. In an apparatus as set forth in claim 1, an annular lip on said mating surface of one said body surrounding at least one said channel opening of said one body; said lip extending outwardly from said mating surface of said one body;

said means forceably clamping said mating surfaces of said bodies together sealably compressing said lip between said mating surfaces to seal communication between said end-to-end aligned channels of said bodies at said mating surfaces.

8. In an apparatus as set forth in claim 7, an annular mouth on said mating surface of said other body surrounding said opening of its said aligned channel;

said mouth extending outwardly from said mating surface of said other body;

said annular mouth being of slightly different diametrical size than said annular lip on said one body to engage said annular lip in jamming sealing relationship to seal communication between said end-to-end aligned channels or said bodies at said mating surfaces.

9. In an apparatus as set forth in claim 7, an extending annular head on one said body aligned concentrically within said lip;

said head housing said channel and channel opening of said one body; and said other body having annular receiving socket aligned with said head;

said socket including said aligned channel and channel opening of said other body;

said lip lying concentrically around one said head and said socket;

said head being sealably jammed in said socket to seal communication between said openings of said end-to-end aligned channels of said bodies at said mating surfaces of said bodies in addition to said lip.

10. In a device as set forth in claim 1, an extending annular head on one said body, said head housing one said aligned channel and channel opening of said one body;

said other body having an annular receiving socket aligned with said head;

said socket including one said aligned channel and said channel opening of said other body;

said head being sealably jammed in said socket to seal communication between said end-to-end aligned channels of said bodies at said mating surfaces.

* * * * *